(12) United States Patent
Lavra et al.

(10) Patent No.: US 9,324,053 B1
(45) Date of Patent: Apr. 26, 2016

(54) RFID TAG CYLINDER INVENTORY CONTROL METHOD

(71) Applicant: Air Liquide Advanced Technologies U.S. LLC, Houston, TX (US)

(72) Inventors: Joshua Lavra, Walnut Creek, CA (US); Giuseppe Liberati, Houston, TX (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 0 days.

(21) Appl. No.: 14/508,313

(22) Filed: Oct. 7, 2014

(51) Int. Cl.
*G06F 19/00* (2011.01)
*G06Q 10/08* (2012.01)
*G07F 11/50* (2006.01)

(52) U.S. Cl.
CPC .............. *G06Q 10/087* (2013.01); *G07F 11/50* (2013.01)

(58) Field of Classification Search
CPC ..... G06Q 10/087; G07F 11/002; G07F 11/62; G07F 7/00
USPC ................................................ 235/385, 383
See application file for complete search history.

(56) References Cited

U.S. PATENT DOCUMENTS

| | | | | |
|---|---|---|---|---|
| 7,624,769 | B2* | 12/2009 | Bartholomew | G07F 11/165 141/104 |
| 7,689,318 | B2* | 3/2010 | Draper | G06F 19/3462 221/2 |
| 8,041,453 | B2* | 10/2011 | Walker | G06Q 10/087 235/378 |
| 8,386,074 | B2* | 2/2013 | Smith, III | G07F 9/006 221/96 |
| 2010/0138037 | A1* | 6/2010 | Adelberg | G06Q 10/087 700/241 |

* cited by examiner

*Primary Examiner* — Seung Lee
(74) *Attorney, Agent, or Firm* — Elwood L. Haynes

(57) ABSTRACT

A method of RFID inventory control for vending containers is provided, including providing a modular vending unit including a rotatable RFID-tagged container storage and dispensing unit, capable of incrementally rotating and locking in predetermined positions, comprising multiple discrete storage volumes each configured to contain a single RFID-tagged container, an access device for accessing the interior of the rotatable RFID-tagged container storage and dispensing unit, capable of switching between a locked and an unlocked state, and configured to cooperate with the rotatable storage and dispensing unit. The system also includes providing an RFID inventory interrogation and data collection device, comprising an RFID transducer capable of sending an interrogate signal, and receiving a RFID response signal from each RFID-tagged container, and an electronic container inventory device in communication with the RFID inventory interrogation and data collection device, configured to indicate a quantity of available containers, and a quantity of unoccupied storage volumes.

15 Claims, No Drawings

RFID TAG CYLINDER INVENTORY CONTROL METHOD

BACKGROUND

The present invention relates generally to vending and dispensing machines and in particular to such a machine for vending a compressed gas cylinders, such as those used in welding.

Standard pressurized gas cylinders, such as the type typically used for shielding gas for welding and for cutting, pose vending problems. These cylinders have a cylindrically shaped tank, a valve at the top of the tank, and a guard substantially encircling the valve and providing a pair of lifting handles. The guard typically has a diameter smaller than the diameter of the outer surface of the tank. These standard cylinders can be relatively heavy, at least 20 pounds, possibly as heavy as 50 pounds.

It is the common practice for an individual, or small business, to acquire or exchange such pressurized gas cylinders at a store front. This can be inconvenient if the demand arises when the store is not open. Therefore, there is a need in the industry for a means for such small quantity users to obtain such cylinders around the clock, in a convenient and secure manner.

SUMMARY

A method of RFID inventory control for vending containers is provided, including providing a modular vending unit including a rotatable RFID-tagged container storage and dispensing unit, capable of incrementally rotating and locking in predetermined positions, comprising multiple discrete storage volumes each configured to contain a single RFID-tagged container, an access means for accessing the interior of the rotatable RFID-tagged container storage and dispensing unit, capable of switching between a locked and an unlocked state, and configured to cooperate with the rotatable storage and dispensing unit. The system also includes providing an RFID inventory interrogation and data collection means, comprising an RFID transducer capable of sending an interrogate signal, and receiving a RFID response signal from each RFID-tagged container, and an electronic container inventory means in communication with the RFID inventory interrogation and data collection means, configured to indicate a quantity of available containers, and a quantity of unoccupied storage volumes.

DETAILED DESCRIPTION

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One embodiment of the present invention is a method of RFID inventory control for vending machines includes providing at least one modular vending unit. This modular vending unit is capable of incrementally rotating and locking in predetermined positions, and includes multiple discrete storage volumes each configured to contain a single container. This modular vending also includes providing an access means for accessing the interior of the rotatable container storage and dispensing unit that is capable of switching between a locked state and an unlocked state and that is configured to cooperate with the rotatable storage and dispensing unit. The modular vending unit also includes providing a control unit for communicating with a user and the at least one modular vending unit.

The control unit includes an input means and an output means, and an electronic container inventory means configured to indicate a quantity of available containers, and a quantity of unoccupied storage volumes. The electronic container inventory means may include RFID tags on the available containers. The electronic container inventory means may include a QR code reader.

The control unit also includes providing an electronic selection means configured to allow the acquisition or return of a container, including an electronic control means for rotating and locking the rotatable container storage and dispensing unit, and an electronic control means for locking and unlocking the access means. The electronic selection device may be a multi-touch screen display. The electronic payment interface may include a credit card payment interface. The electronic payment interface may include an NFC payment interface.

One embodiment of the present invention is a method of RFID inventory control for vending machines. This system includes providing a modular vending unit. The modular vending unit may have a rotatable RFID-tagged container storage and dispensing unit, capable of incrementally rotating and locking in predetermined positions, comprising multiple discrete storage volumes each configured to contain a single RFID-tagged container.

This system may also include providing an access means for accessing the interior of said rotatable RFID-tagged container storage and dispensing unit, capable of switching between a locked state and an unlocked state, and configured to cooperate with said rotatable storage and dispensing unit. This system may also include an RFID inventory interrogation and data collection means, comprising an RFID transducer capable of sending an interrogate signal, and receiving a RFID response signal from each RFID-tagged container. This system may also include providing an electronic container inventory means in communication with said RFID inventory interrogation and data collection means, configured to indicate a quantity of available containers, and a quantity of unoccupied storage volumes. A user may interface with the electronic selection means in order to obtain or return a container, and the electronic container inventory means updates in real-time.

Embodiments of the present invention generally provide methods and systems for inventorying and vending gas cylinders by using radio-frequency identification (RFID) technology. In one embodiment, each gas cylinder includes a RFID transponder configured to transmit a RFID signal. The RFID signal includes an identifier which uniquely identifies each gas cylinder, thus indicating the presence of the gas cylinder in a particular storage volume within a modular vending unit. In addition, the RFID signal may include other useful information, such as gas composition, pressure, etc.

The RFID signals may be received by an RFID inventory interrogation and data collection means. In one embodiment, the RFID inventory interrogation and data collection means is locally located It is contemplated that any of the foregoing embodiments (and other embodiments disclosed herein) may be done separately or collectively (in any combination) in a given system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Each module may include localization RFID receivers and/or gateway RFID receivers. The localization RFID receivers may be configured to receive RFID signals from the respective RFID transponders of any gas cylinders which are present in a module. The gateway RFID receivers may be configured to receive RFID signals from RFID transponders for gas cylinders passing through an access means (e.g., an electronically locked and unlocked door). Further, the gateway RFID receivers may be positioned around the module so as to improve the reception of RFID signals (e.g., positioned at the same height as a gas cylinder).

In one embodiment, each RFID transponder is fixed to a gas cylinder, and may be configured to remain inactive until it receives a wireless excitation (i.e., activation) signal. Once activated, each RFID transponder responds by transmitting a RFID signal, including an identification code that may be used to uniquely identify each gas cylinder. The RFID transponders may be active transponders, meaning that the RFID signal is transmitted with an active power source (e.g., a battery). In another embodiment, the RFID transponders may be passive transponders, meaning that the RFID transponders are powered inductively by an inductive power coupling with a proximately located RFID receiver configured to issue an activation signal. In yet another embodiment, the RFID transponders may include a combination of active and passive transponders, where both transponders may transmit the same cylinder identification code. For example, a given RFID transponder may include an active transponder configured to transmit to a localization receiver, as well as a passive transponder configured to transmit to a gateway receiver. In yet another embodiment, each RFID transponder may include an active transponder configured to periodically (or constantly) transmit the RFID signal, without requiring an activation signal. In yet another embodiment, an RFID transponder may be configured to store data included in inbound RFID signals (e.g., an activation signal). Such stored data may include a transaction code, a time stamp, etc. In yet another embodiment, an RFID transponder may be configured to receive commands included in inbound RFID signals and, in response, to perform an action within the transponder, such as activating, deactivating, or resetting the transponder.

The RFID signals may conform to RFID protocols known in the art, or to any other wireless communication protocols including, for example IEEE 802.11, Global System for Mobile Communications (GSM), Bluetooth, or ZigBee.

Generally, the gas cylinder management application may be configured for the management of gas cylinders, for example the gas cylinders. For instance, users may perform asset management, such as locating a specific gas cylinder, performing an inventory, etc. Further, users may manage the replenishment of gas stocks as they are needed. Furthermore, the gas cylinder management application can be configured to analyze data received from the wireless transponders to selectively generate alarms. For example, an alarm may be generated when two incompatible gases (e.g., gases that are reactive to each other) are stored together improperly. Other alarms may be generated, for example, when conditions (e.g., pressure, temperature, etc.) are outside acceptable ranges, when an improper gas flow is detected, when the stored gas is past its expiration date, when a cylinder is due for (or is past) a required certification (e.g., pressure testing), or when the battery powering the wireless transponder is low.

The electronic payment interface may be configured to allow for payments or refunds. The electronic payment interface may include a credit card payment interface. The electronic payment interface may include an NFC payment interface.

The access permission means may be configured to rotate the rotatable container storage and dispensing unit to a predetermined position, and allow access to a discrete storage volume by modulating the access means.

In one embodiment of the present invention, one module may house oxygen and other inert gases, while a different module may house acetylene, other combustible gases, and inert gases. The module with the acetylene may be equipped with a lower explosive limit (LEL) meter.

The modules may have provisions for monitoring temperatures and thereby activating ventilation fans under conditions of high ambient or module internal temperatures. Safety alarms may be generated by the system.

What is claimed is:

1. A method of RFID inventory control for vending containers, comprising:
    providing a modular vending unit, comprising
        a rotatable RFID-tagged container storage and dispensing unit, capable of incrementally rotating and locking in predetermined positions, comprising multiple discrete storage volumes each configured to contain a single RFID-tagged container,
        an access means for accessing the interior of said rotatable RFID-tagged container storage and dispensing unit, said rotatable RFID-tagged container storage and dispensing unit being capable of switching between a locked state and an unlocked state, and configured to cooperate with said rotatable storage and dispensing unit,
    providing an RFID inventory interrogation and data collection means, comprising an RFID transducer capable of sending an interrogate signal, and receiving a RFID response signal from each RFID-tagged container,
    providing an electronic container inventory means in communication with said RFID inventory interrogation and data collection means, configured to indicate a quantity of available containers, and a quantity of unoccupied storage volumes, providing an electronic selection means, configured to allow the acquisition or return of a container, said electronic selection means comprising a first electronic control means for rotating and locking said RFID-tagged container storage and dispensing unit, and a second electronic control means for unlocking and locking said access means, whereby a user interfaces with said electronic selection means in order to obtain or return a container, and said electronic container inventory means updates real-time.

2. The method of RFID inventory control of claim 1, wherein the cylinder RFID tag uniquely identifies each cylinder.

3. The method of RFID inventory control of claim 1, wherein the cylinder RFID tag includes information on the compressed gas contained within the cylinder.

4. The method of RFID inventory control of claim 3, wherein the information contained is the gas composition.

5. The method of RFID inventory control of claim 1, wherein the cylinder RFID tag remains inactive until it receives a wireless activation signal.

6. The method of RFID inventory control of claim 1, wherein the cylinder RFID tag is an active transponder.

7. The method of RFID inventory control of claim 6, wherein the active transponder is configured to periodically transmit an RFID signal.

8. The method of RFID inventory control of claim 6, wherein the active transponder is configured to continuously transmit an RFID signal.

9. The method of RFID inventory control of claim 1, wherein the cylinder RFID tag is a passive transponder.

10. The method of RFID inventory control of claim 1, wherein the cylinder RFID tag is a combination of an active transponder and a passive transponder.

11. The method of RFID inventory control of claim 1, wherein the cylinder RFID tag provides a signal that conforms to an RFID protocol selected from the group consisting of IEEE 802.11, Global System for Mobile Communications, Bluetooth, and ZigBee.

12. The method of RFID inventory control of claim 1, wherein the RFID inventory interrogation and data collection means comprises a localization RFID receiver.

13. The method of RFID inventory control of claim 1, wherein the RFID inventory interrogation and data collection means comprises a gateway RFID receiver.

14. The method of RFID inventory control of claim 1, wherein the RFID inventory interrogation and data collection means comprises both a localization RFID receiver and a gateway RFID receiver.

15. The method of RFID inventory control of claim 14, wherein the cylinder RFID tag comprises an active transponder configured to transmit to the localization RFID receiver, and the cylinder RFID tag comprise a passive transponder configured to transmit to a gateway receiver.

* * * * *